Patented Apr. 23, 1940

2,198,372

UNITED STATES PATENT OFFICE 2,198,372

SINTER, METHOD OF PREPARATION AND USE THEREOF

Blakeslee Barnes, New York, N. Y., assignor to Chemical Construction Corporation, New York, N. Y., a corporation of Delaware No Drawing. Application November 5, 1938, Serial No. 239,025

6 Claims. (Cl. 75—5)

The present invention relates to a sinter and a method of producing the same, utilizing certain commercial wastes and particularly useful in the production of fused alumina and its products.

The invention is particularly concerned with the sintering of a mixture of bauxite, iron oxide, with or without titanium oxide, and sufficient fuel to initiate the fusion and to such methods which may utilize waste commercial products therein, although not necessarily limited thereto.

Large quantities of bauxite are mined annually which, in processing, are subjected to a crushing operation with the production of a quantity of fines and dust which must be separated from the granular material and disposed of, for ordinarily such fines and dust are not preferred in processes using granular masses. It is one important object of the present invention to find an outlet for this dust and fines.

In the art of refining petroleums, it is common practice to filter the same through granular bauxite, the spent bauxite extracted with a relatively low-boiling hydrocarbon, which extraction is followed by steaming and regeneration in a calcining furnace. This treatment gives rise to a waste product which is principally bauxite with carbon contained within its pores or cells. This waste product is particularly useful in carrying out the method of the present invention in that not only does the method take advantage of the carbon contained within the mineral, but such bauxite contains more or less quantity of titanium oxide which is a useful ingredient in a mix looking toward the manufacture of abrasive alumina.

Ferrous working plants and those producing titanium products have as waste material, large quantities of pickle liquor containing valuable contents of iron and titanium in the form of sulfates. This liquor is ordinarily a drug on the market and must be disposed of at prices which are out of all proportion to the values contained therein. It is another important object of the present invention to utilize either this pickle liquor as such or the solid residues thereof obtained by roasting the same under such conditions as to convert its metalliferous content to the oxide.

It has been proposed to recover sulfur values from acid sludges resulting from the treatment of oils with sulfuric acid by heating the same in a rotary kiln with such materials as bauxite under conditions to produce and recover sulfur dioxide from the mix. As a result of this treatment, the process contemplates the production of a solid residue consisting principally of bauxite, more or less impregnated with carbonaceous material and mechanically mixed with coke-like carbon. This product may be advantageously used in the present process looking toward the production of a desirable sinter.

The present electric furnace product for the production of fused alumina involves the heat treatment of aluminum-containing materials such as bauxite with carbon, and where an abrasive material is eventually to be formed, with additional quantities of iron oxide and titanium oxide. Such processes as ordinarily conducted give rise to considerable quantities of dust, even though the aluminous substance initially treated exists as rather large masses. For this reason, it has not been possible heretofore to employ such materials, for instance, as bauxite fines or dust because of dust difficulties in initial handling and during the process. It is another important object of the invention, therefore, to produce a sinter from bauxite fines and dust, which may be had at costs materially lower than the crushed bauxite heretofore used, together with desirable quantities of iron oxide, titanium oxide and coke in a form which will facilitate the electric furnace operation and reduce the cost thereof, while minimizing dust troubles.

To this end, the invention contemplates in its broadest aspect, sintering together bauxite and iron oxide into agglomerates particularly adaptable for electric furnace fusion in the production of fused alumina. Such bauxite may either be the crushed granular material of commerce, dust and fines ordinarily discarded, carbon-impregnated bauxite of which by-product material from petroleum refining is typical, or an impregnated bauxite mechanically mixed with coke such as is contemplated in an acid sludge recovery process using bauxite as a heating medium. The iron oxide may be that ordinarily available for electric furnace processes or that recovered from the treatment of pickle liquors in the iron and/or titanium industries. As a matter of fact, the pickle liquors from such industries may be used direct as a temporary bonding agent for the bauxite and used in a quantity sufficient to produce a more or less plastic mass introduced into the sintering furnace.

The invention further consists in the details of the process and products thereof hereinafter more fully described.

As an illustration of one method of carrying out the invention and looking toward the eventual production of an abrasive alumina, a mix is made of bauxite, iron oxide and fuel, such as coke. An analysis of these ingredients is helpful in order to determine the proper proportions thereof to be used, it being usually desirable to mix them so that a sinter with a uniform content of $Fe_2O_3$ may be obtained.

The thus proportioned materials for the mix may be fed to a mixer of rotary drum or other type to which water equal to approximately 10% of the weight of the feed is sprayed on the mix while agitated. The bauxite may be either the crushed material of commerce, that impregnated with carbon, but preferably comprises the dust and fines ordinarily undesirable in the eventual process. The iron oxide may either be that ordinarily used, although preferably it is that obtained as a result of roasting pickle liquors.

In place of water, ordinary pickle liquor from the iron and steel industry or that produced from titanium plants and containing residual quantities of titanium may be used, it being only necessary that a quantity sufficient to coagulate the fine particles of the mix into large, loosely bound grains be utilized. If pickle liquors are used, a larger quantity of the liquor may be required in view of its lesser moisture content. However, in such case, the additional metallic values in such liquor are of decided advantage as they form a useful ingredient in the final fusion process. As thus treated, the material increases in volume and makes a porous bed when fed to the movable grates of the sintering machine. The fuel used will ordinarily be coke either added as such or that mechanically mixed with bauxite from an acid sludge treating process or coke from other sources may be used alone. The material to be sintered is fed to the grates and moves under an oil or gas burner to ignite the fuel or coke in the mix. The draft artificially created keeps this fuel in combustion. After the sinter has been completed, it is cooled and dumped from the grates onto a grizzly from which it is sized into three classes, fines, medium and coarse. The fines may be put back into the mix for re-sintering while a portion of the medium is returned to the grates to form a porous bed for the coarse particles. This bed material protects the grates from over-heating and maintains a free passage for gas flow during the sintering operation.

The coarse material is crushed until it is medium sized, that is, from $\frac{1}{4}$ to $\frac{1}{2}$ inch, as this size of aggregates are particularly suitable for electric furnace feed in the manufacture of fused alumina.

The sintered product from the machine is clinkerlike, ranging in size from small granules like sand to agglomerated pieces several inches in diameter. Individual granules are hard but due to the control of the iron in the mix, the fused bond between the granules is such that it is easily broken without producing dust. Where bauxite fines have gone into the mix, these are adequately held and bonded into the masses, so that even when the larger agglomerates are crushed, for instance, in a roll crusher or the like, no excessive amount of fines is produced.

In physical appearance, the sinter prepared for shipping is gray, black or yellowish black depending upon its position on the movable grates during the sintering operation.

A typical average analysis of bauxite useful for the above process is as follows:

| | Per cent |
|---|---|
| $Al_2O_3$ | 56.5 |
| $Fe_2O_3$ | 5. |
| $SiO_2$ | 6. |
| $TiO_2$ | 2.5 |
| Loss on ignition | 30. |

It has been found desirable with a bauxite as above, that coke and iron oxide cinder in approximately the following proportions be used:

| Bauxite fines | 1 ton |
|---|---|
| Coke | 6% |
| Iron oxide cinder | 3% containing 1.5% to 2% titanium oxide. |

Obviously, these proportions may be varied with different bauxite depending on the $Fe_2O_3$, $SiO_2$ and $TiO_2$ values contained either in the original bauxite or the iron oxide cinder or both.

While the mix is being sintered, the temperature rises to approximately 1200° C. very quickly. This temperature may be maintained for about 8 minutes after which the material is quickly cooled and discharged from the machine. This product is particularly useful in the manufacture of fused alumina in an electric furnace with an additional quantity of coke and/or iron and/or titanium. This additional quantity, of course, depends entirely on the analysis of the sinter.

The electric furnace fusion operation ordinarily takes place at a temperature of from 2000 to 2100° C. The time required in a furnace of approximately five tons capacity being from 26 to 30 hours. However, in using the sintered product described above and particularly where the bauxite initially used was in the form of dust and fines, an abrasive product of equal grade results using the same temperature but in a period of time ranging for from 20 to 24 hours. This results, therefore, in a material reduction on the power cycle. It has been found that the fused granule product produced from a controlled mix on the sintering machine, makes a remarkably smooth and easily operated feed for the electric furnace. This is not only due to the low dust quantities in the material but also to the previous partial fusing and to the shape and size of the granules which cause less difficulty in the actual control of the material after it is in the furnace.

While the invention has been shown and described with specific reference to particular embodiments, it is to be understood that it is not to be limited thereto but is to be construed broadly and restricted only by the scope of the claims.

I claim:

1. A method of utilizing the values in waste pickle liquors which includes mixing a quantity thereof with waste bauxite and carbon and sintering the same.

2. The method of claim 1 in which the quantity of pickle liquor used is that necessary to produce a plastic mix.

3. The method of claim 1 in which the bauxite used is in the form of dust and fines.

4. The method of claim 1 in which the values in the pickle liquor include iron and titanium.

5. The method which comprises making a mix of pickle liquor residues including iron oxide and titanium oxide, bauxite fines and coke and sintering the same.

6. A method of utilizing the values in waste pickle liquors which includes mixing a quantity thereof with bauxite and carbon and sintering the same.

BLAKESLEE BARNES.